(12) United States Patent
Weinraub et al.

(10) Patent No.: US 12,382,110 B1
(45) Date of Patent: Aug. 5, 2025

(54) TRANSPARENT MEDIA ASSET SUBSTITUTION USING BROADCAST DELIVERY SYSTEMS

(71) Applicant: Edge Networks, Inc., Sun Valley, ID (US)

(72) Inventors: Mitch Weinraub, Englewood, CO (US); Imran Arif Maskatia, Palo Alto, CA (US)

( * ) Notice: Subject to any disclaimer, the term of this patent is extended or adjusted under 35 U.S.C. 154(b) by 0 days.

(21) Appl. No.: 17/865,377

(22) Filed: Jul. 14, 2022

(51) Int. Cl.
*H04N 21/232* (2011.01)
*H04N 21/466* (2011.01)
*H04N 21/482* (2011.01)

(52) U.S. Cl.
CPC ....... *H04N 21/232* (2013.01); *H04N 21/4667* (2013.01); *H04N 21/482* (2013.01)

(58) Field of Classification Search
CPC ............. H04N 21/4667; H04N 21/482; H04N 21/232; H04N 21/252; H04N 21/25883; H04N 21/2665; H04N 21/2668; H04N 21/4147; H04N 21/4333; H04N 21/4348; H04N 21/4382; H04N 21/4532; H04N 21/454; H04N 21/47; H04N 21/4722; H04N 21/6125; H04N 21/6405; H04N 21/6587; H04N 21/8106; H04N 21/8166; H04N 21/8456; H04N 21/8547; H04N 7/173
See application file for complete search history.

(56) References Cited

U.S. PATENT DOCUMENTS

| | | | | |
|---|---|---|---|---|
| 2002/0162109 | A1* | 10/2002 | Shteyn | H04N 21/2747 725/38 |
| 2007/0250863 | A1* | 10/2007 | Ferguson | H04N 21/454 725/35 |
| 2020/0169776 | A1* | 5/2020 | Clift | H04N 21/8166 |
| 2021/0099749 | A1* | 4/2021 | Bogatin | H04N 21/6131 |

* cited by examiner

*Primary Examiner* — Rong Le
(74) *Attorney, Agent, or Firm* — Krishna Kalidindi (57) ABSTRACT

A method of communicating a media asset includes: receiving a media asset selection from a viewer, determining if the selected media asset is available in a memory of a user device or is currently being broadcast to the user device associated with the viewer, if the selected media asset is available in the memory: retrieving the selected media asset, else: retrieving the selected media asset from a network location and communicating an identity of the requested media asset to a controller.

11 Claims, 10 Drawing Sheets

TRANSPARENT MEDIA ASSET SUBSTITUTION USING BROADCAST DELIVERY SYSTEMS

CROSS-RELATED APPLICATIONS

The present disclosure is related to each of the pending U.S. Patent Applications: Ser. No. 16/591,767 filed on Oct. 3, 2019; Ser. No. 17/377,373 filed on Jul. 15, 2021; Ser. No. 17/508,215 filed on Oct. 22, 2021; Ser. No. 17/508,221 filed on Oct. 22, 2021; Ser. No. 17/520,782 filed on Nov. 8, 2021; Ser. No. 17/700,672 filed on Mar. 22, 2022; and Ser. No. 17/741,643 filed on May 11, 2022. The subject matter of each of these pending applications is incorporated in its entirety herein by reference.

BACKGROUND

This disclosure is directed systems and methods for receiving and processing data signals. The data signals can include audio visual (AV) signals such as television (TV) signals for example. These signals can be referred to as media assets.

A recently adopted television standard, ATSC 3.0 (Advanced Television Systems Committee) provides for the broadcast (over the air, OTA) of television signals an internet protocol (IP) format—the format in which data is communicated over a broadband and/or internet connection.

OTA interface is a traditional communication path for broadcasting to all receivers within a physical viewing or receiving range. Transmission over a broadband (or network), on the other hand, can take place via unicast (one destination) or multicast (multiple destinations).

In some systems, AV content may be encoded at a central location and communicated to local or regional areas for broadcast transmission over the air (OTA).

Example embodiments of the present disclosure provides an efficient, effective and reliable method for receiving and processing data signals over multiple paths.

The terms "user", "viewer", "customer" and "consumer" are used interchangeably within this disclosure. A "viewer" and "viewer premises" are also used interchangeably. The terms "AV signals", "AV content", "AV program", "data", "data files", "broadcast content", "media content" and "media asset" are also used interchangeably and may refer to audio, video, text and/or a combination thereof. The terms "communicated", "transmitted", "submitted" and "sent" are all used interchangeably to indicate the sending of data. The terms "existing" and "active" are also used interchangeably in referring to an alert. The terms "data channels", "data subchannels", "data streams", "data sub streams" and "subchannels" are also used interchangeably.

SUMMARY

According to an example embodiment, a method of communicating a media asset is disclosed. The method comprises: receiving a media asset selection from a viewer; determining if the selected media asset is available in a memory of a user device or is currently being broadcast to the user device associated with the viewer; if the selected media asset is available in the memory or the broadcast is being received, retrieving the selected media asset; else, retrieving the selected media asset from a network location; and communicating an identity of the requested media asset to a controller.

According to another example embodiment, a computing device is disclosed. The computing device comprises: a processor; a memory; a plurality of communication interfaces; and a system bus for interconnecting the processor, the memory and the communication interfaces. A first one of the plurality of communication interfaces is configured to receive and process media assets from a central content controller (CCC) over an over the air (OTA) broadcast path and a second one of the plurality of communication interfaces is configured to communicate over a network path with a media asset location. The processor is configured to: process data signals corresponding to a media asset received OTA; store the processed OTA signals in the memory; process a viewer input received over a viewer input device, the viewer input identifying a media asset; and determine if the identified media asset is in the memory or is currently being broadcast. If the identified media asset is in the memory or is currently being received, the identified media asset is retrieved, else the media asset is retrieved from a network location. The retrieved media asset is presented to the viewer over an output device.

According to a further example embodiment, one or more non-transitory machine-readable media comprising program code for implementing communication of a media asset is disclosed. The program code, when executed by one or more processors of a user device cause the one or more processors to: receive a media asset selection from a viewer; determine if the selected media asset is available in a memory of a user device or is currently being broadcast to the user device associated with the viewer; if the selected media asset is available in the memory or the broadcast is being received, retrieve the selected media asset; else, retrieve the selected media asset from a network location; and communicate an identity of the requested media asset to a controller.

BRIEF DESCRIPTION OF THE DRAWINGS

The several features, objects, and advantages of example embodiments will be understood by reading this description in conjunction with the drawings. The same reference numbers in different drawings identify the same or similar elements. In the drawings.

DETAILED DESCRIPTION

In the following description, numerous specific details are given to provide a thorough understanding of embodiments.

The embodiments can be practiced without one or more of the specific details, or with other methods, components, materials, etc. In other instances, well-known structures, materials, or operations are not shown or described in detail to avoid obscuring aspects of the example embodiments.

Reference throughout this specification to an "example embodiment" or "example embodiments" means that a particular feature, structure, or characteristic as described is included in at least one embodiment. Thus, the appearances of these terms and similar phrases in various places throughout this specification are not necessarily all referring to the same embodiment. Furthermore, the particular features, structures, or characteristics may be combined in any suitable manner in one or more embodiments. The headings provided herein are for convenience only and do not interpret the scope or meaning of the embodiments.

According to example embodiments, methods and systems are disclosed for utilizing separate delivery paths for communicating data signals to viewers in an ATSC 3.0 environment.

Figure 1:
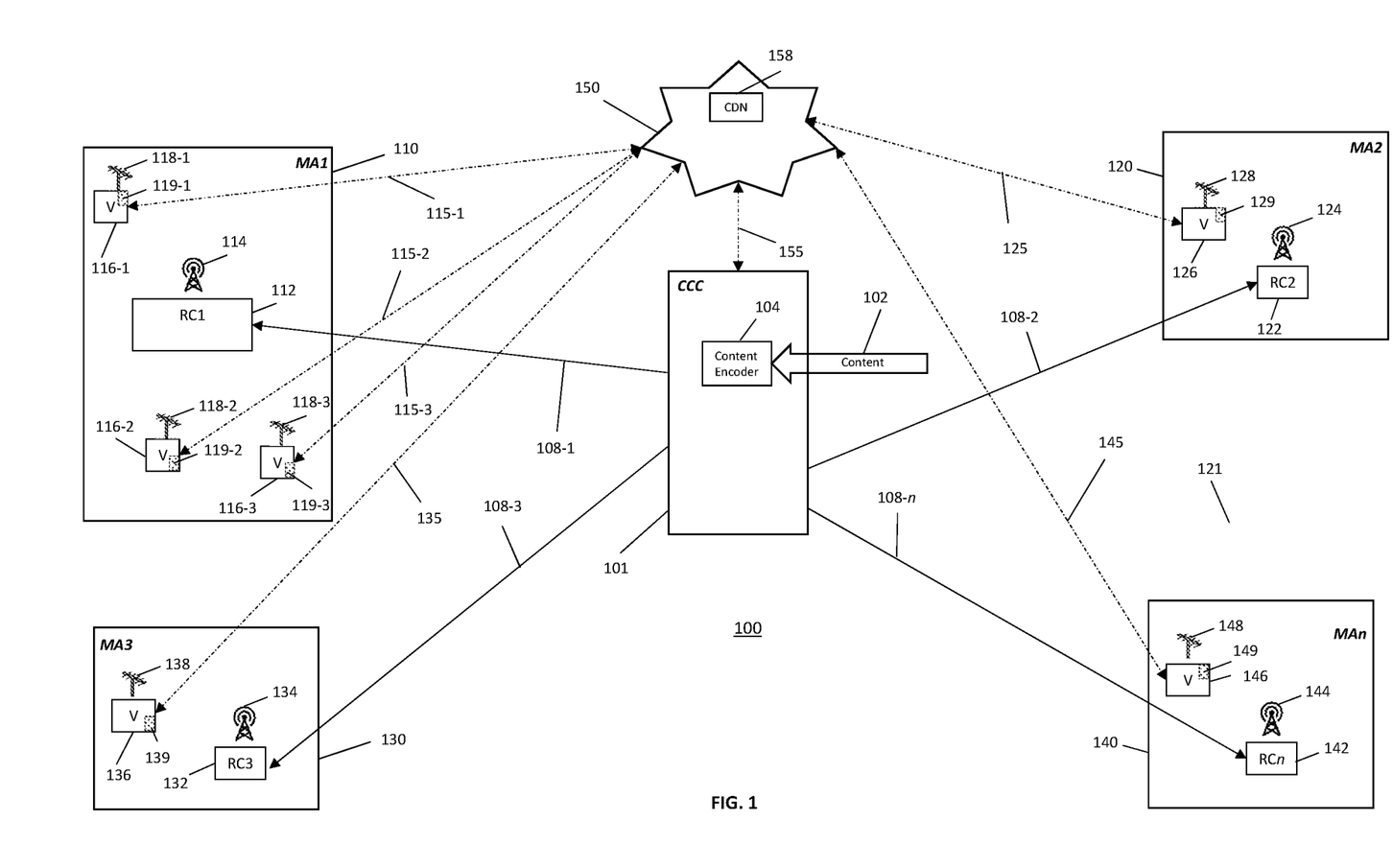
FIG. 1 illustrates a system according to example embodiments.

A system in accordance with example embodiments may be described with reference to FIG. 1. System 100 may comprise a central content controller (CCC) 101. Viewers may be located in a plurality of market areas (MAs). A market area can be a broadcast coverage area or a geographic area. The physical size of a market area can vary from a few square miles to as much as over one hundred square miles. A MA can be a contiguous geographic area for example. In system 100 of FIG. 1, four such market areas 110, 120, 130 and 140 are illustrated. While four MAs are illustrated, this number is an example and the actual number of MAs can be higher or lower.

Each market area may have a regional controller (RC) associated therewith. RC1 (112) can be associated with MA1 (110), RC2 (122) can be associated with MA2 (120), RC3 (132) can be associated with MA3 (130) and RCn (142) can be associated with MAn (140).

Data or content (such as audio visual (AV) data/content for example) 102 from a plurality of sources may be received at CCC 101. The data or content can also be referred to as a media asset. The source of the data may be, but is not limited to, a national television network for example. The data may be received by CCC 101 over dedicated terrestrial or satellite networks or over the Internet 150. The received data may be encoded by encoder 104 of CCC 101.

Content encoder 104 may encode the received data 102 into an IP delivery form using a particular codec such as MPEG-2 or H.265 for example. The encoded data can be packetized and encrypted. In can also be packaged using MPEG Dash or HLS or MP4 for example.

The encoded data may be communicated as one or more streams (data streams or AV streams for example) by CCC 101 to one or more of a plurality of regional controllers (RCs) 112, 122, 132 and 142 (associated with market areas 110, 120, 130 and 140) over a corresponding communication medium or link 108-1, 108-2, 108-3 and 108-4. The communication medium can be a physical private network such as, satellite, microwave, terrestrial or fiber for example. The communication medium can also be a virtual private network (VPN) created over a public network such as the internet for example.

The medium (108-1, 108-2, 108-3, 108-4) over which the data streams are sent (or communicated) utilizing the internet protocol (IP) may be structured similar to a broadcast channel. In an example implementation, a broadcast channel may represent a 6 MHz slice of the radio frequency (RF) spectrum. The 6 MHz frequency bandwidth is specific for broadcasting in the US and in North America—it may be different in other jurisdictions.

The data streams may be sent using Studio-to-Transmitter Link Tunneling Protocol (STLTP). The data streams may be multiplexed by a multiplexer (not illustrated) and exit CCC 101 via a broadcast gateway (not illustrated) and received by a RC. An exciter (not illustrated) at the RC may modulate the data streams onto an RF frequency and send the modulated data streams to the broadcast antenna for broadcasting to the market area in a known manner.

A RC can have an antenna associated therewith for broadcasting the data streams (as data or AV signals for example) over-the-air (OTA) to viewers in the corresponding market area (MA). That is, RC1 (112) can be associated with antenna 114, RC2 (122) can be associated with antenna 124, RC3 (132) can be associated with antennal 134 and RCn (142) can be associated with antenna 144.

The AV signals broadcast by the antenna can be received by viewers within reception range of the AV signals. In MA1 (110) for example, RC1 (112) broadcasts AV signals via broadcast antenna 114. Viewers 116-1, 116-2 and 116-3 within MA1 (110) can receive the AV signals broadcast by antenna 114.

A viewer 116-1 may receive the AV signals via an antenna 118-1 associated with the viewer premises for example. That is, antenna 118-1 can be associated with viewer 116-1, antenna 118-2 can be associated with viewer 116-2 and antenna 118-3 can be associated with viewer 116-3.

The received AV signals can be decoded and processed for presentation to a viewer by a user communication device such as a set-top-box (STB) 119-1 for example. A viewer and associated STB can be associated with a viewer premises such as a home or an office, etc. That is, STB 119-1 can be associated with viewer 116-1 and antenna 118-1, STB 119-2 can be associated with viewer 116-2 and antenna 118-2 and STB 119-3 can be associated with viewer 116-3 and antenna 118-3.

In MA2 (120), RC2 (122) can broadcast AV signals via broadcast antenna 124 for reception by viewer 126 via antenna 128 and processing by STB 129. A similar arrangement is illustrated for the remaining market areas such as MA3 and MAn.

For illustrative purposes, three viewers 116-1, 116-2 and 116-3 are shown as being located in MA1 (110) and within a reception range of the AV signals from broadcast antenna 114 of RC1 (112). One viewer (126, 136 and 146) is illustrated as being located in each of MA2 (120), MA3 (130) and MAn (140). However, the number of viewers within a MA is typically much higher. In some scenarios, a viewer can receive broadcast AV signals from RCs corresponding to multiple MAs due the viewer being located in a physical area where broadcast AV signals from adjacent MAs can overlap.

A viewer (116-1, 116-2, 116-3, 126, 136 and 146) within system 100 utilizing an associated STB can also be connected via a broadband/network connection (115-1, 115-2, 115-3, 125, 135 and 145) to CCC 101 over the Internet or the cloud 150. CCC 101 may be connected to the Internet 150 via a communication link 155.

The network connection(s) 115-1, 115-2, 115-3, 125, 135 and 145 may provide a medium over which input from a viewer can be communicated via an associated STB to CCC 101. The network connection can also be utilized to provide technical information from a STB to the CCC. The technical information can include received broadcast data quality for example. A STB can also request data via a content delivery network (CDN). CDN 158 may be accessible over the internet 150. CDN 158 may be intermediate (i.e. between) the STB (such as 119-1, . . . 129, 139, etc.) and CCC 101. The CDN can be a node on the internet for example; it is illustrated as being a "part" of the internet for simplicity. The network connection can also communicate data from CCC to one or more CDNs.

Figure 2:
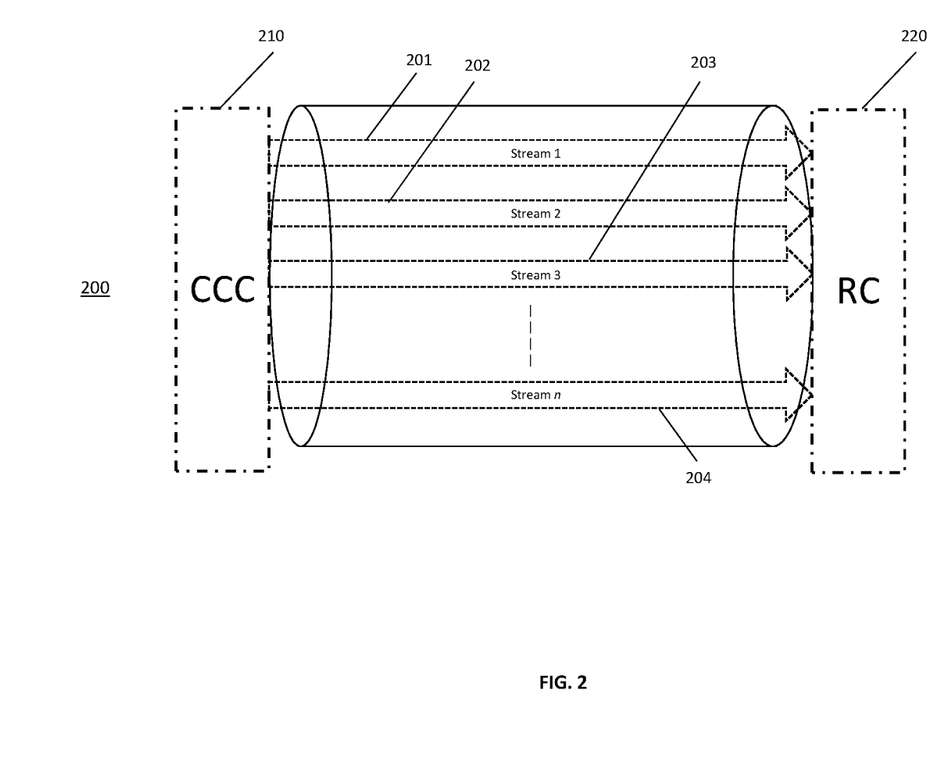
FIG. 2 illustrates a communication link according to example embodiments.

An example communication link, such as 108-1 . . . 108-n (of FIG. 1), may be described with reference to FIG. 2. Communication link 200 may comprise a plurality of data channels 201, 202, 203 and 204 (associated with one frequency for example). A physical broadcast channel can consist of one or more audio-video (A/V) streams, audio-only streams and data streams as well as additional signaling information. Each of these channels can carry a data stream such as data Stream 1, Stream 2, Stream 3, . . . , Stream n. The data stream can be A/V, video, audio and/or data only (i.e. no video or audio).

In this context, the phrase "data only" may refer to a stream where the tuner does not search for and play video or audio components of the stream but makes the data on the stream available to other processes on the set-top box for consumption. As such, the bandwidth requirements for a data only channel can be less than those for A/V, video, audio, etc. Each of these channels can also be referred to as subchannels (may also be known as digital subchannels as they are included/implemented in a digital broadcast system). A stream may correspond to a linear list of programs (a "lineup" or "channel") for example. Separate streams, therefore, may contain separate programs.

Communication link 200 may correlate to a 6 MHz broadcast channel for example. The link may provide the medium for communicating a data stream (or streams) representing the information broadcast on the frequency in a STLTP format. The number of subchannels and streams can vary based on transmission parameters such as modulation and code rate that facilitate adjusting of the signal characteristics such as range, strength and the like. Only four such subchannels and streams are illustrated as an example.

In one implementation example, the broadcast channel bandwidth of 6 MHz may correspond to approximately 40 Mbps for a specific combination of transmission parameters. If a 4K stream is encoded at 20 Mbps (per stream) for example, two such streams can be included (for 40 Mbps). If a 720p stream is encoded at 2 Mbps (per stream) in another example, twenty such streams can be included. A combination of streams with varying rates can also be included. Using a combination of these for example, one 4K (at 20 Mbps) stream and ten 720p (2 Mbps each) streams can be included.

A plurality of encoded data streams (corresponding to one physical channel for example) can be transmitted over link 200. Each stream (A/V, audio-only, or data) can be assigned to a separate subchannel. Stream 1 can be transmitted over subchannel 201, stream 2 on subchannel 202, etc. The streams can be transmitted or "sent" by CCC 210 and received by RC 220.

The plurality of subchannels can be modulated and multiplexed by RC. Content corresponding to a plurality of channels (each having a plurality of subchannels) can be communicated between CCC 210 and RC 220 for example.

The receiving RC can then transmit the received streams via an associated broadcast antenna to the market area corresponding to the RC. The signals broadcast from the RC to a user (e.g. RC 112 to viewers 116-1, 116-2 and 116-3 of FIG. 1) may also be in a form similar to that of communication link 200—that is, the signals my be arranged as a plurality of data streams for each subchannel of a plurality of channels.

As highlighted above, the data signals can be decoded and processed for presentation to a viewer by a user communication device such as STB 119-1 for example.

The encoded data streams received by the RCs may be broadcast to viewers (or viewer premises) within the associated market area (MA) as described above. A RC can receive signals from CCC that can include, for example, television programming for a plurality of channels operating on one or more associated frequencies. Each of the frequencies can include a plurality of subchannels in a digital broadcast system.

Under ATSC 3.0, television signals may be broadcast utilizing the internet protocol (IP). The format used is the same format used for communicating data over a broadband and/or internet connection.

According to an example embodiment, a viewer selection or request of a media asset (movie, news, sporting event, etc.) for delivery over a network (a two way network such as the internet) may be fulfilled by broadcast delivery (i.e. one-way communication) over the air (OTA) of at least a portion of the media asset. In another example embodiment, the number of requests for a network delivery of a media asset within a predetermined period of time may be used as a basis to broadcast the media asset for archival (for future viewing/usage for example) in a plurality of user devices. Each request may be associated with a particular viewer or a plurality of request may be associated with a particular viewer. One or more of the user devices may be associated with viewers other than those requesting the media asset.

The number of requests being monitored may be one example of a predictive technique for determining popularity of a particular media asset. Such popularity may indicate an increased likelihood of that media asset being requested by additional viewers or by the same viewer on additional occasions (viewers or devices associated with viewers). Broadcasting such popular media asset for archival in a memory associated with a user device (such as a STB) facilitates a more rapid access to the media asset for the viewer.

Figure 3:
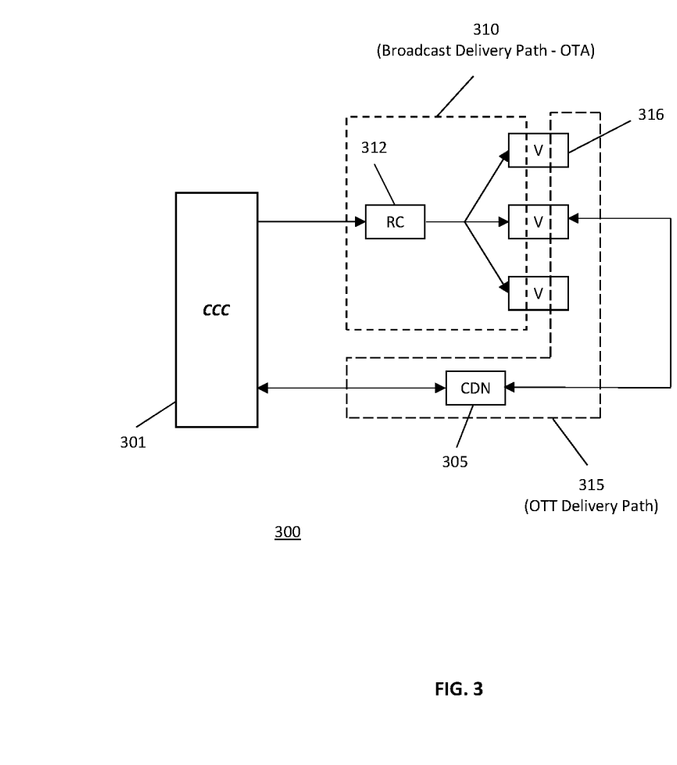
FIG. 3 illustrates a system for communicating media assets according to example embodiments.

As illustrated in FIG. 3, CCC 301 may include (or have access to) a plurality of media assets. The media asset may be communicated to RC 312 for broadcast ("pushed") to viewers 316 within the market area of RC 312. This (one way) path is designated as a broadcast delivery path-OTA 310.

The media assets may also be communicated (by the CCC) to one or more CDNs 305 (via a two-way communication path). The media assets may be retrieved ("pulled") by a STB corresponding to a viewer 316 from a CDN 305 that is geographically closest to the viewer (also via a two-way communication path). The path corresponding to the communication of the secondary or alternate data is designated as an OTT (over the top) delivery path 315.

Figure 4:
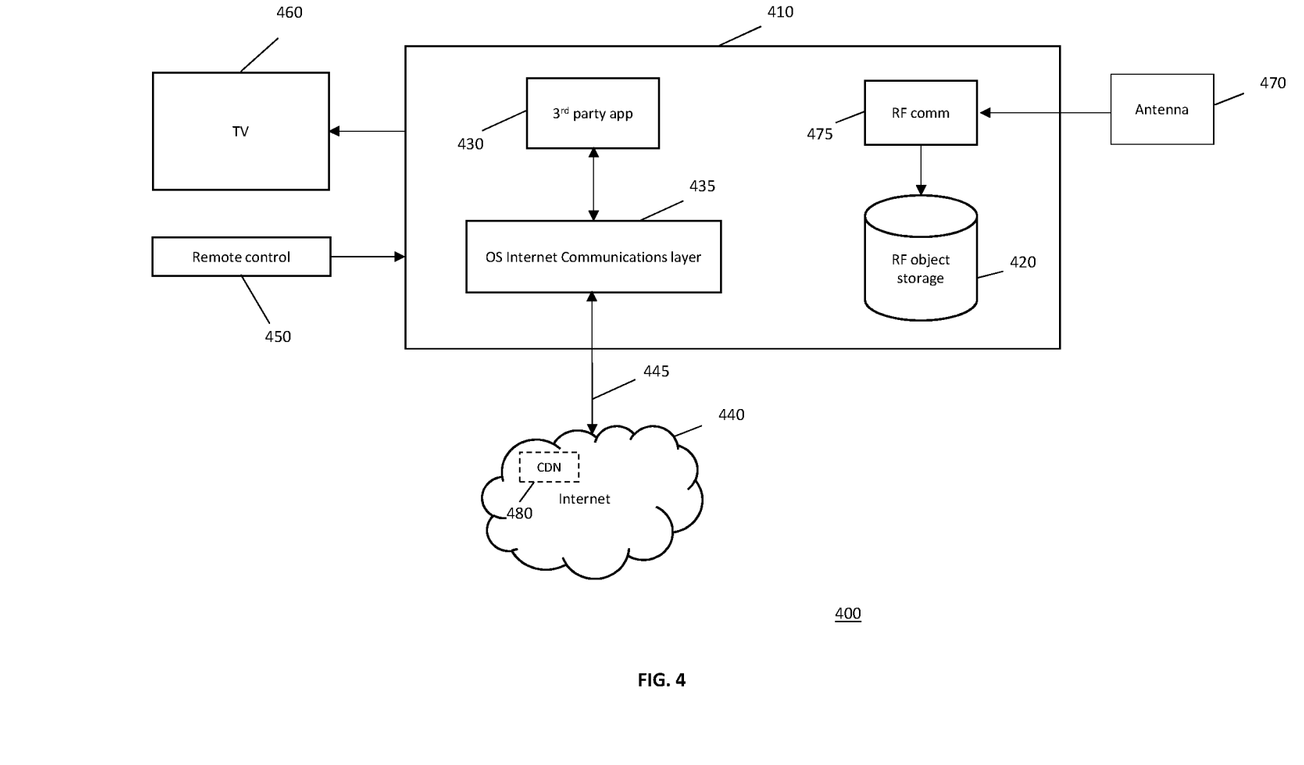
FIG. 4 illustrates a media asset being received at a user device over a network.

A system 400 associated with a viewer for retrieving a media asset may be described with reference to FIG. 4. System 400 may include a user device 410. Device 410 may be a set top box for example. Device 410 may receive signals (representing media content or media assets) that are broadcast over the air (OTA) utilizing an antenna 470 and one or more tuners ("RF [Radio Frequency] Comm") 475. The OTA signals can be stored in storage 420 ("RF Object Storage") for subsequent consumption for example.

Device 410 may also receive signals over a communication link 445 connected to a network such as the internet 440 for example. The received signals can be audio, video, text, data or a combination thereof.

The presentation can be on a display 460 such as a television, a computer or a radio for example. A user or viewer interaction with the user device 410 can take place via an input device 450. The input device can be a remote control for example.

A viewer can access media content (i.e. media assets) via a streaming service such as, but not limited to, Sling™, Hulu™ for example. Each such service typically includes application software ("app") on the user device that facilitates interaction between a viewer/user and the streaming service. Such an app can be referred to as a "$3^{rd}$ party app" or "$3^{rd}$ party application". A viewer can launch the app via an icon 430 displayed on a computer display/monitor or television screen. A viewer can stream content by selecting appropriate commands associated with the app. The app can communicate to a node or a location on the internet via an interface 435 ("OS [Operating System] Internet Communication Layer"). The node or location can correspond to a content delivery network (CDN) 480. CDN 480 can provide the requested media content or media asset (in the form of a via a universal resource locator, "URL", for example) to the requesting app 430.

The media asset presented to a viewer by system 400 may either be received via OTA broadcast (in real time or archived) or streamed over a network. While the user device receives signals broadcast via OTA using the antenna and/or are received via a network, the OTA signals are not accessible to the app.

The app 430, storage 420, interface 435 and tuner 475 are illustrated as being included within the user device 410. One or more of these elements can also be located outside the user device but be associated with the user device.

Figure 5:
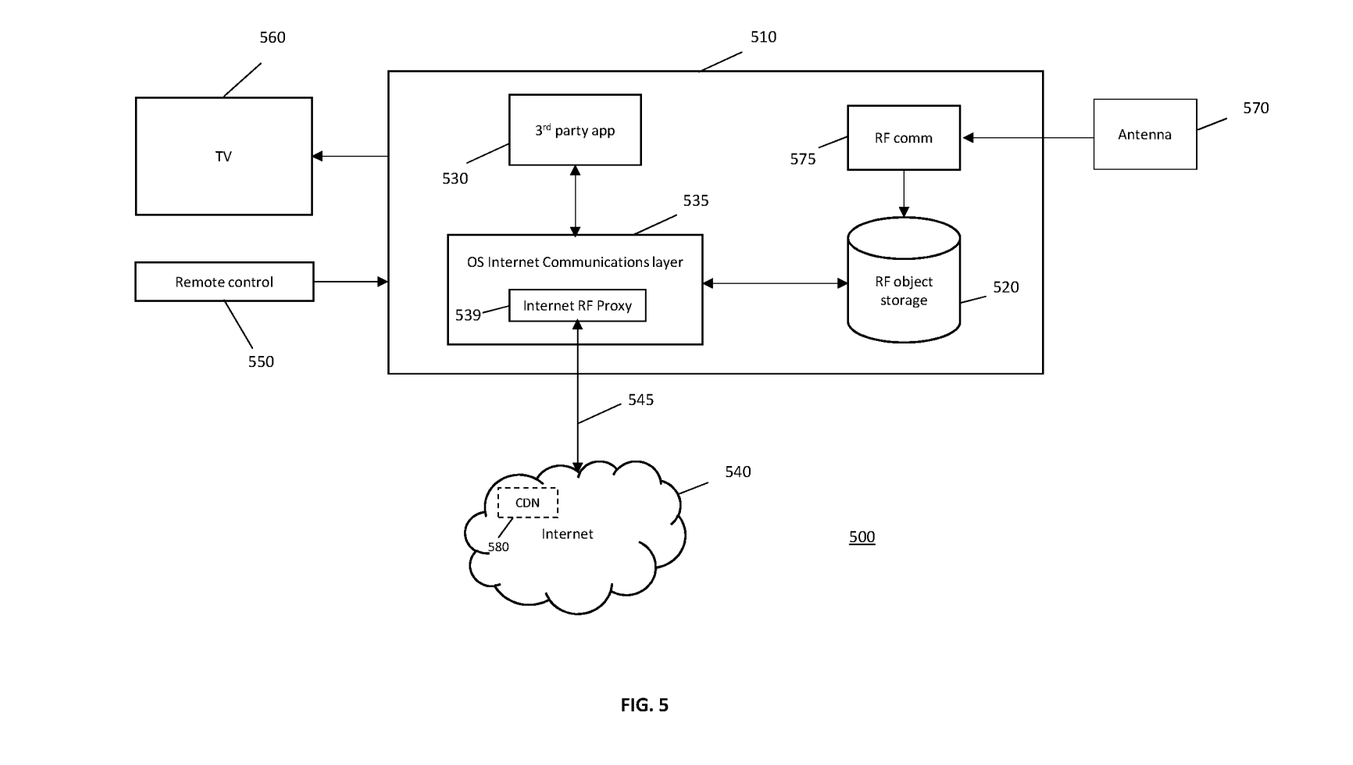
FIG. 5 illustrates a media asset being received at a user device according to example embodiments.

In an example embodiment, as illustrated in FIG. 5, a system may facilitate retrieval and presentation of broadcast content in response to a request for streaming made via an app. System 500 may include a user device 510 having an application software ("$3^{rd}$ party app") 530, communication interface (OS Internet Communication Layer) 535, input device 550, output device 560, antenna 570 and tuners 575. The OS communication layer can function as a communication interface for network communication and the antenna and tuners can function as another communication interface for processing OTA signals. User device 510 can also be connected over a communication link 545 to a network such as the internet 540. A CDN 580 may be accessible over the network. Viewer requests may be made via an icon on the output device. The icon may be associated with the $3^{rd}$ party app.

In addition, system 500 may include an Internet RF Proxy 539 that may be associated or included within the interface 535. Internet RF Proxy 539 may be inserted in the communication path of the OS Internet Communication Layer 535. The Internet RF Proxy 539 may intercept the requests made to the OS Internet Communication Layer 535. RF Proxy 538 may examine/evaluate the request and relay it to the OS Internet Communication Layer. The Internet Communication Layer 535 may make requests of content from a CDN service.

In system 500, upon a viewer selection for streaming via an icon associated with app 530, proxy 539 may determine whether the viewer selected media asset is currently available without having to be retrieved from a CDN. In one example scenario, the content requested may already be available in storage 520. It may have been received earlier OTA and stored in storage 520. In another example scenario, it is currently being broadcast OTA (i.e. "live") and being received (i.e. it is available via the tuner). The signals received via the broadcast are available to be tuned into by the user device (e.g. STB).

If the media asset is currently available, the media asset may be presented to the viewer. In this case, the request from the app to the OS Internet Communication Layer, intercepted by the Internet RF Proxy is not (or need not be) relayed to an external server or CDN since the request has been satisfied by its availability "locally" (media asset being in memory or its current OTA broadcast is being received by the STB). If the media asset is unavailable locally, the media asset may be retrieved over communication link 545 from CDN 580 located within network 540. The retrieved media asset may be presented to the viewer or can be archived.

Figure 6:
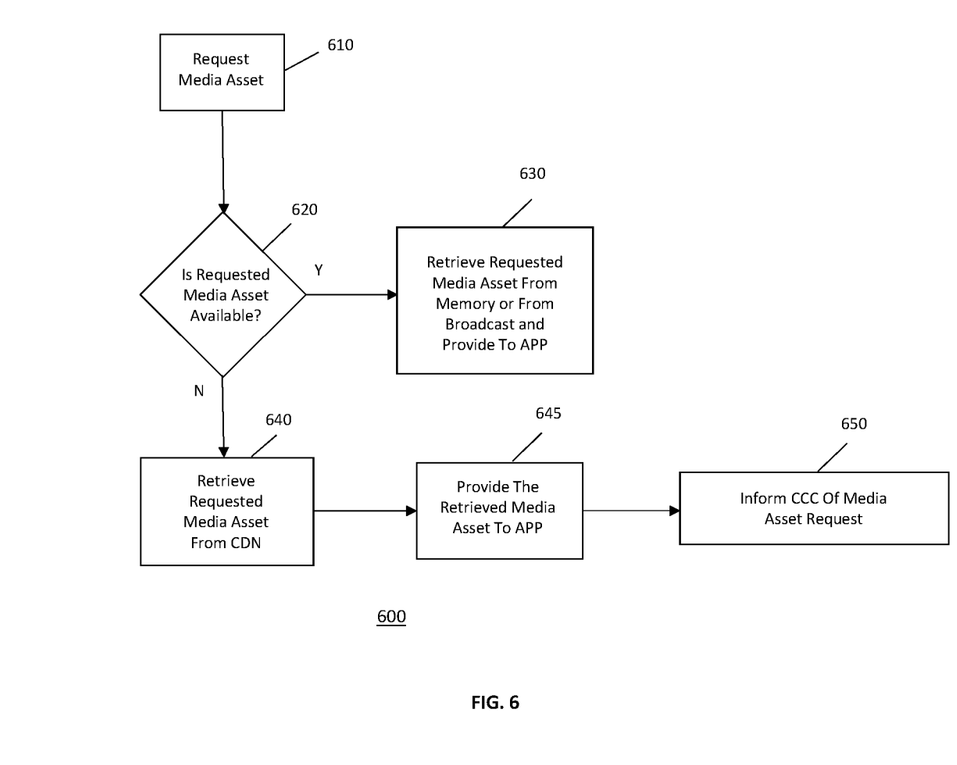
FIG. 6 illustrates a method for processing a media asset request according to example embodiments.

A method in accordance with example embodiments may be described with reference to FIG. 6. In method 600, a viewer may request a media asset at 610. The request may be made via an app icon (corresponding to $3^{rd}$ Party App 530 of FIG. 5) using a user input device (e.g. remote 550 of FIG. 5 for example). A determination may be made (by proxy 539 of FIG. 5 for example) as to whether the requested media asset is available locally (i.e. stored in the memory of the user device or is being broadcast and being received OTA). If the media asset is available, it may be retrieved and provided to the requesting app at 630. The requesting app may then present the retrieved asset on a display device of the requesting viewer for example (i.e. device 560 of FIG. 5).

If the media asset is determined to be unavailable (not in memory 520 of user device 510 of FIG. 5 for example or is not being broadcast) at 620, it may be retrieved from a CDN at 640. The media asset retrieved from the CDN may be provided to the requesting app at 645. A central controller (such as CCC 101 of FIG. 1 for example) may be informed by the proxy at 650 of the requested media asset being retrieved from a CDN. In some embodiments, the request of a media asset from the CDN can also result in the CCC being informed. In one embodiment, the number of requests for a particular media asset may be incremented with each request.

Example embodiments as described herein do not involve an alteration of a $3^{rd}$ party application. The $3^{rd}$ party application makes its request for Internet-delivered content (the media asset) and the Internet RF proxy finds the media asset in the RF Object Storage (if it exists there) and returns it to the app just as if it were coming from the Internet. The $3^{rd}$ party app benefits from this without needing to make any modifications to its code.

Figure 7:
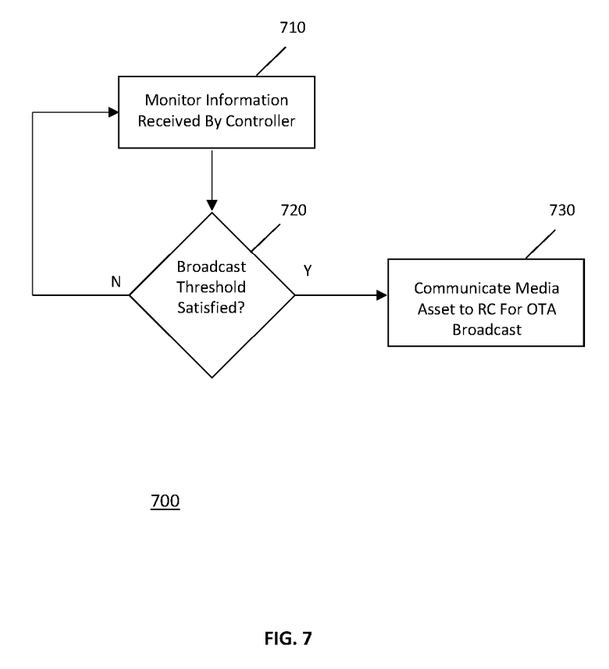
FIG. 7 illustrates a method for determining a media asset broadcast according to example embodiments.

An example method for processing media asset requests by the CCC may be illustrated with reference to FIG. 7. In method 700, the CCC may monitor the information received by the controller at 710. The received information may be evaluated at 720 to determine whether a pre-determined threshold or condition has been satisfied for broadcasting the requested media asset (in some embodiments, there can be a plurality of conditions that need to be satisfied). If the pre-determined condition has not been satisfied, the CCC may continue to monitor information received at 710. If the pre-determined condition has been satisfied, the requested media asset may be communicated by the CCC, at 730, to a regional controller RC for OTA broadcast within the area corresponding to the received RC.

In an example embodiment, the threshold may be the number of (user/viewer) requests for a particular media asset over a pre-determined period of time. In another example embodiment, the CCC may be instructed to broadcast a particular media asset based on popularity of a related media asset. In such a scenario, the information relied upon for communicating of media assets by CCC to RC may not be from the proxy. The related media asset may be a popular past media asset that is a prequel to the particular media asset for example. The popularity may be based on actual history or can be based on modelling techniques.

In general, the data signals may be from a plurality of sources such as the STB, industry, analytics/heuristics, manual curation, etc. A specific content may be popular at a particular point in time. For example, a large number of viewers may be requesting to watch a basketball game between Denver and Golden State. In such case, the present game (as well as such a future matchup) can be broadcast OTA. A specific content may have been popular at a given time. For example, movie XYZ ("XYZ" being a fictional title) may be popular in Boise, ID on Saturday mornings. An example system may broadcast this program on Friday night for archival and consumption on Saturday morning. If the latest (daily) episode of a particular program is viewed regularly at a particular time, the CCC can create a heuristic to automatically broadcast each night's episode as soon as it is available and make it available so that when viewers select the program for viewing via the app, it is readily available.

Programs for broadcast can also be manually curated in some embodiments. Programming teams associated with the CCC may gain knowledge that a new episode of a previously popular program is about to be released. A determination can be made that this episode is likely to have a high demand and it can be broadcast proactively and made available to viewers. When the new episode is requested for streaming, it can be obtained from storage where it has been stored after being broadcast OTA (i.e. not from CDN).

If the CCC has determined that a particular TV series or movie franchise is popular among a segment of the population, subsequent media assets can be broadcast OTA based on the knowledge that the initial (and popular) media asset is part of a series. If episodes from season 1 of program ABC ("ABC" being a fictional title) are being requested at a high rate, episode from seasons 2 and 3 can be broadcast (OTA) preemptively.

Media assets may not be delivered as a single file. They may instead be delivered as multiple files each containing a portion of a media asset. A thirty (30) minute episode of KLM ("KLM" being a fictional title) may be made up of nine hundred (900) segments each containing two (2) seconds of audio/video/text. If the CCC notices that a series of segments from KLM are being requested for streaming, subsequent segments of KLM (the media asset) can be broadcast (OTA) since the likelihood of requests for subsequent segments is high.

Figure 8:
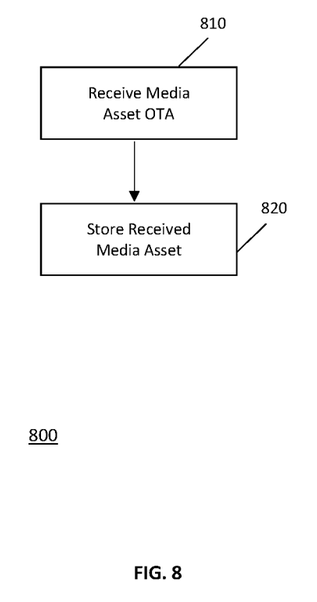
FIG. 8 illustrates a method for archiving broadcast media assets according to example embodiments.

An example method for processing the received broadcast media assets may be illustrated with reference to FIG. 8. In method 800, the broadcast media asset may be received and processed by the user device (i.e. STB 510 for example) at 810. The processed media asset may be stored in memory associated with the user device at 820. If the media asset is currently being broadcast, it can be displayed to the viewer and/or also be stored.

In an embodiment where the popularity of a particular media asset is determined by the number of requests for that media asset, that media asset may initially be obtained by a predetermined (i.e. threshold) number of viewers via a network from a CDN. Once this threshold has been exceeded, the CCC may broadcast the media asset OTA. Once the broadcast media asset is stored in a user device, subsequent requests for the particular media asset can be satisfied by retrieving the media asset from the memory without invoking network streaming.

Media assets can be broadcast to all market areas or can be customized to a subset of the market areas based on popularity of the media asset in that subset of market areas. Media assets stored in memory can be deleted or replaced based on a plurality of criteria. A first-in, first-out (FIFO) principle can be used for example. The stored media asset can also be removed after being retrieved a predetermined number of times. It can also be removed after a predetermined period of time such as a week or a month, or the like.

Figure 9:
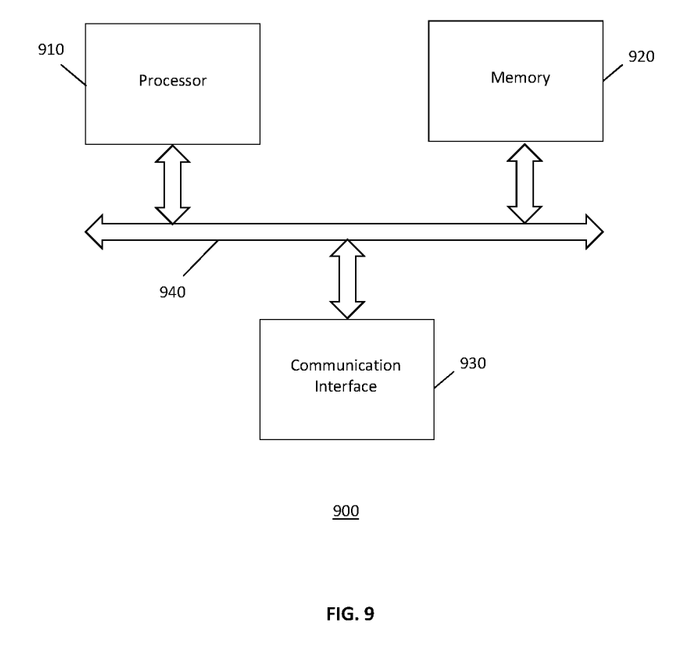
FIG. 9 illustrates a controller according to example embodiments.

A central content controller (CCC) in accordance with example embodiments is illustrated in FIG. 9. CCC 900 may include, but is not limited to, a processor 910, a memory 920, a communication interface 930 and a system bus 940 for interconnecting these components in a known manner. CCC 900 can be a general-purpose computing device. A processor or memory can also refer to a plurality of processors or memory devices.

Processor 910 may incorporate the functionality described above with respect to FIG. 7. for example. It may encode content and assign data streams to subchannels for example. Processor 510 may also prepare the primary data 302 and secondary data 304 of FIG. 3.

Interface 930 may provide communication between CCC 101 (of FIG. 1) and the plurality of RCs 112, 122, 132 and 142 in their respective MAs 110, 120, 130 and 140 via paths 108-1, 108-2, 108-3 and 108-4 for example. The paths may be dedicated private network(s) for example.

Interface 930 may also facilitate communication between the CCC 101 and STBs 119-1, 119-2, 119-3, 129, 139 and 149 (thru CDN 158 for example) via the Internet 150 (and links 115-1, 115-2, 115-, 125, 135, 145 and 155 for example).

CCC 900 may have AV content stored within memory 920. Memory 920 may also store any other information necessary for facilitating the functionality of the CCC. This may include, but is not limited to, content received from multiple sources, information received from the STBs (such as viewer profiles, preferences, requests and/or subscriptions, etc.), alerts received, list of market areas, routing information to communicate with RCs and instructions for encoding and assigning data streams to subchannels for example.

A RC can also comprise a processor, a memory, a communication interface and a bus interconnecting these components as described with reference to a CCC. Utilizing these components, the RC can receive content from CCC and broadcast the content over the air (OTA).

Figure 10:
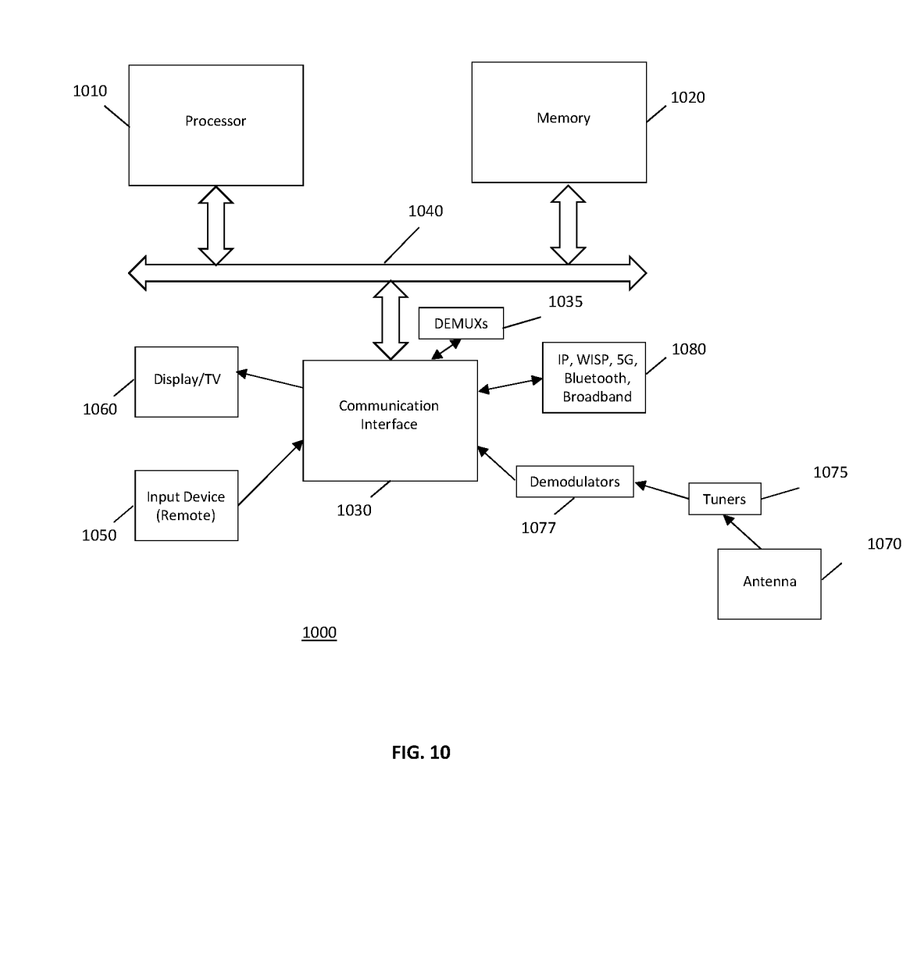
FIG. 10 illustrates a user device according to example embodiments.

An example communication device associated with a viewer such as a set-top-box (STB) in accordance with example embodiments is illustrated in FIG. 10. STB 1000 (labeled as 119-1, 119-2, 119-3, 129, 139 and 149 in FIG. 1) may include, but is not limited to, a processor 1010, a memory 1020, a communication interface 1030 and a system bus 1040 for interconnecting these components in a known manner. The STB may also be referred to as a user communication device.

Communication interface 1030 may receive viewer inputs via a remote control or a keyboard or other such input device 1050. Interface 1030 may receive data streams on the subchannels via an antenna 1070 (if signal is broadcast/broadcast multicast for example) or over an ISP gateway/modem 1080. STB 1000 may also comprise at least one or more tuner(s) 1075 for tuning into the various broadcast frequencies. STB 1000 may also comprise a demultiplexers (DEMUXs) 1035 for demultiplexing the received streams.

Interface 1030 may also provide communication with a display or monitor (e.g. TV) 1060 for displaying AV content. The display may have audio output for playing the audio component of an AV file. Interface 1030 may also communicate data with CCC 101 of FIG. 1 (over network 150 and links 115-1, 115-2, 115-, 125, 135, 145 and 155 for example). The data may include viewer input indicating viewer preferences such as content selection for the type programming that can be communicated to the viewer for example. Memory 1020 may store the received streams (i.e. recording) for viewing at a time chosen by the viewer.

Processor 1010 may process the signals received via antenna 1070 for presentation on display 1060 as well as process various inputs from a user/viewer input device 1050.

The STB could be any reception device. It need not be limited to a typical hardware device as highlighted above. It can be any device (or software) that comprises, but not be limited to, tuners, processor, storage, internet connection and broadcast reception. It can be a mobile phone, a tablet, a laptop, a desktop or the like. It can be an application (or an "app") running on any of these devices. A component (or software module) may be a single device or be constituted as multiple devices (such as network-attached storage, etc.).

Features and functionality associated with example methods and systems as described above may be implemented via software instructions executing on one or more processors of one or more general purpose computing devices or computing systems for example. The user device can also include these one or more processors.

While the disclosure highlights AV content, example embodiments are not restricted to processing and presenting such content. Any type of data can be processed and presented utilizing aspects of the example embodiments described herein.

Further, in the description and the appended claims the meaning of "comprising" is not to be understood as excluding other elements or steps. Further, "a" or "an" does not exclude a plurality, and a single unit may fulfill the functions of several means recited in the claims.

The above description of illustrated embodiments and what is described in the Abstract below, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in relevant art. Such modifications are intended to be covered by the appended claims.

The various embodiments described above can be combined to provide further embodiments. Aspects of the embodiments can be modified, if necessary, to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method of communicating a media asset comprising:
   receiving a request for a media asset from a viewer via a $3^{rd}$ party application software associated with a streaming content provider;
   intercepting the request by an internet RF proxy operating within an internet communication layer;
   determining, by the internet RF proxy, if the requested media asset is available in a memory of user device associated with the viewer or if the requested media asset is currently being broadcast over the air (OTA) to the user device in an advanced television system committee (ATSC) 3.0 environment;
   if the requested media asset is available in the memory of the user device or if the requested media asset is being broadcast OTA to the user device,
      retrieving, by the internet RF proxy, the requested media asset from the memory or from the OTA broadcast;
   else,
      retrieving, by the internet RF proxy, the requested media asset from a network location; and
      communicating an identity of the requested media asset to a central content controller (CCC), wherein the $3^{rd}$ party application is unaltered during each of the determining, retrieving and communicating with the CCC steps wherein functionality associated with the internet RF proxy is located within the user device.

2. The method of claim 1, further comprising:
   providing the retrieved media asset to the $3^{rd}$ party application for presentation to the viewer.

3. The method of claim 1, wherein the stored media asset is received by the user device from the CCC via a regional controller (RC), the media asset being received earlier than a time of the media request.

4. The method of claim 1, further comprising:
   monitoring information received at the CCC;
   determining if a predetermined condition has been satisfied;
   if the condition has been satisfied,
      communicating a media asset to a regional controller (RC); and
      broadcasting the received media asset by the RC to a corresponding market area.

5. The method of claim 4, further comprising:
   continuing the monitoring of information received at the CCC if the condition has not been satisfied.

6. The method of claim 4, wherein the broadcast by the RC to the corresponding market area is over the air (OTA).

7. The method of claim 6, further comprising:
   receiving and processing the OTA broadcast media asset by the user device.

8. The method of claim 7, further comprising:
   storing the processed media asset in a memory of the user device.

9. The method of claim 8, further comprising:
   removing the stored media asset from the memory upon occurrence of a predetermined event.

10. The method of claim 1, further comprising:
    determining a composition of the requested media asset, the composition including one of a single file or a plurality of sequential segments.

11. The method of claim 10, further comprising:
    retrieving a first plurality of segments over the network; and
    broadcasting segments subsequent to the first plurality over the air (OTA).

* * * * *